Dec. 4, 1945.　　　　C. H. EVANS　　　　2,390,432
PREPARATION OF CHLORINE DIOXIDE AND NITROGEN OXIDES
Filed Sept. 8, 1941
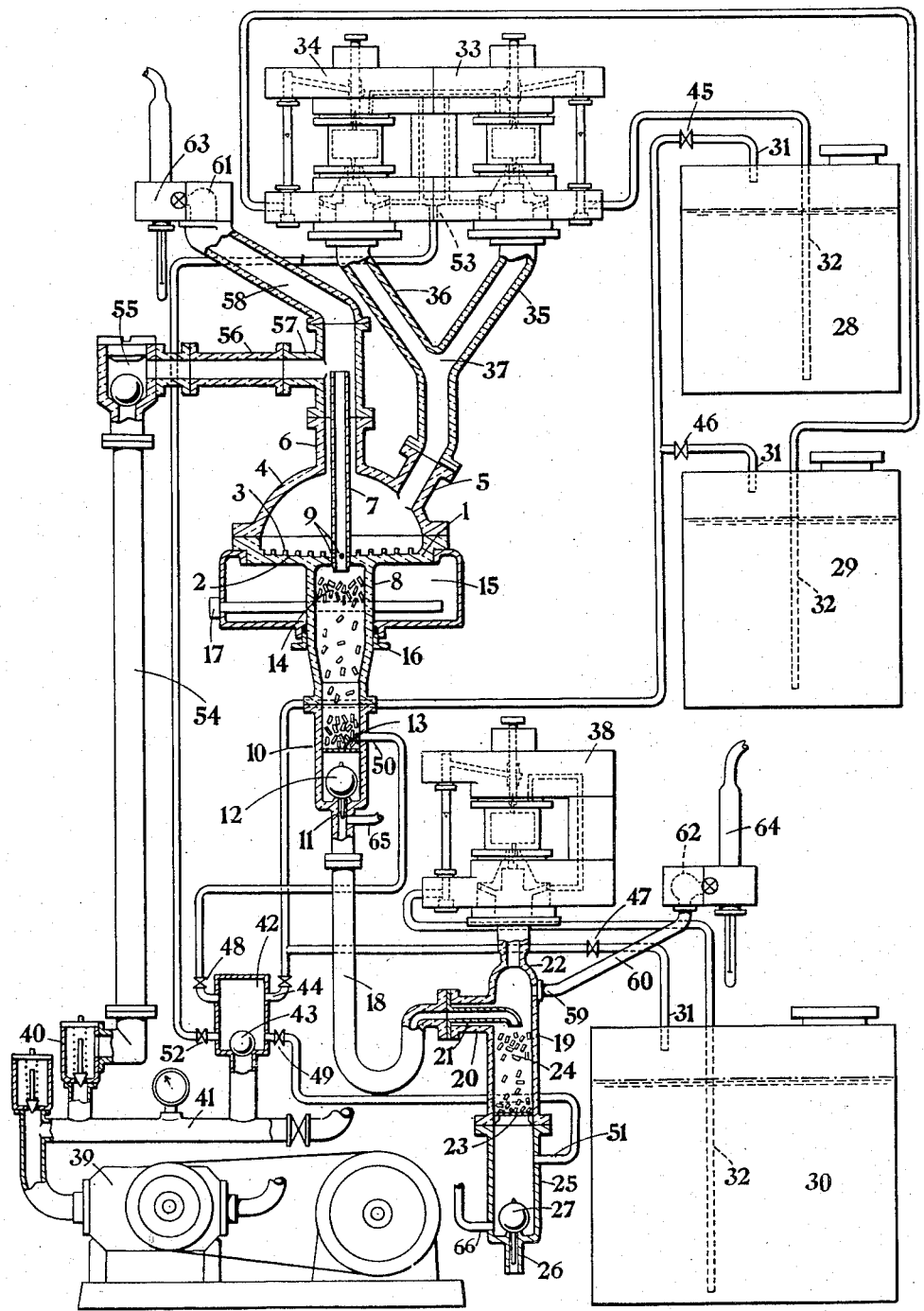
Inventor
C. H. Evans:
by
W. E. Evans
Attorney.

Patented Dec. 4, 1945

2,390,432

UNITED STATES PATENT OFFICE 2,390,432

PREPARATION OF CHLORINE DIOXIDE AND NITROGEN OXIDES

Cyril Harry Evans, Snaresbrook, London E. 11, England

Application September 8, 1941, Serial No. 410,077
In Great Britain May 6, 1940

8 Claims. (Cl. 23—283)

This invention relates to the preparation of chlorine dioxide and nitrogen oxides.

In the specification of Patent No. 2,344,346 filed February 1, 1939, there are described an improved method and apparatus for the preparation of chlorine dioxide by contacting the solution of a chlorate and an acid reactant flowing in a stream during the reactions that result in the production of chlorine dioxide, removing the gaseous reaction products on their release from the reaction mixture in the stream, and maintaining the reaction mixture at any position in the stream from contact and admixture with the reaction mixture at any other position at which the reactions may have developed.

The present invention has among its objects to improve and simplify the apparatus serving for the preparation of chlorine dioxide, to ensure the maximum production of chlorine dioxide, to effect the advantageous utilization of the waste acidic liquors that are discharged from the apparatus by which chlorine dioxide is prepared, to produce nitrogen oxides in a continuous process, and to provide means whereby the bleaching and improving in baking quality of flour may be effectively carried out.

The invention consists in an apparatus for generating chlorine dioxide according to the process of the main patent in which the mixture of solutions of the reagents is caused to follow a spiral or equivalent extended course that is formed upon a substantially horizontally disposed surface provided within the reaction chamber, the mixed solutions being supplied at the one end of the spiral or like course and the waste liquors being discharged at the other end of the said course.

The surface may be of any suitable formation, that is to say, it may be flat, coned, concave or convex and the spiral or like course may be formed by grooves or channels in the surface or by ribs or ridges on the surface. Where the surface is flat the course may be of spiral form or alternately may be in a series of parallel or other sections or stages that may form a tortuous path for the solutions of the reagents. Where the surface is other than flat, the spiral or like course may be formed in sections or stages at different elevations, and the sections or stages may be concentrically disposed. Where the surface is flat it is immaterial at which end of the spiral or equivalent extended course the reagents are supplied, but when the surface is other than flat it will be understood that the reagents will be supplied at that part of the surface which is at the highest elevation. The waste liquors discharged from the spiral or like course may be delivered to a packed tower or the like through which may pass air or other gas that is inert with respect to the reaction and that serves for the removal of any remaining gas.

The reagents which it is preferred to employ in the apparatus for the preparation of chlorine dioxide as described are sulphuric acid and a solution of sodium chlorate and sodium chloride. The sulphuric acid may be of 70% concentration while the salt solution may contain for example 33% of sodium chlorate and 20% of sodium chloride. It is found that by using one volume of the mixed chlorate and chloride solution to one half volume of 70% sulphuric acid advantages in efficiency of the apparatus and convenience in operation are secured inexpensively. Increasing the proportion of 70% sulphuric acid has no prejudicial effect upon the reaction so that the amount of sulphuric acid necessary to be added for reaction with sodium nitrite for a subsequent production of oxides of nitrogen is not objectionable. Again, hydrochloric acid and sodium chlorate, with or without sulphuric acid, may be used as the reagents for the preparation of chlorine dioxide.

It will be understood that in preparing chlorine dioxide, while it is preferred to use as the reagents sulphuric acid and a solution of sodium chlorate and sodium chloride, more praticularly in the proportions hereinbefore indicated, effective use may be made of the alternative reagents sodium chlorate and hydrochloric acid with or without sulphuric acid. Thus, for example, a solution of sodium chlorate of a 33% concentration may be used with an equal volume of an acid mixture made up of 85 parts of concentrated hydrochloric acid, 9 parts of concentrated sulphuric acid and 6 parts of water or with an equal volume of an acid mixture consisting of 50 parts of concentrated hydrochloric acid and 50 parts of 70% sulphuric acid.

It is preferred to carry out the reaction under heat which may be supplied from a heating jacket applied to the reaction chamber and the heat may be controlled, advantageously thermostatically, the temperature being preferably maintained between 49° C. and 71° C. The reaction may, however, be carried out at a lower temperature or without the application of heat.

The invention further comprises a process for the preparation of nitrogen oxides consisting in adding to the waste acidic liquor resulting from the preparation of chlorine dioxide from a chlorate and an acid or acids, sodium nitrite for the preparation of oxides of nitrogen.

The oxides of nitrogen are advantageously prepared by causing the waste acidic liquor in admixture with a solution of sodium nitrite to flow downwardly through a tower packed with material suitable to produce effective distribution of the mixture. Other means or apparatus may, however, be employed for the distribution of the mixture of acidic liquor and sodium nitrite solution under conditions promoting the formation of the oxides of nitrogen. Thus the mixture may be reacted in an apparatus for the preparation of chlorine dioxide such as is described in the specification of the parent case or in the present specification.

Chlorine dioxide and/or chlorine may be applied to numerous purposes, but one of them, the bleaching and maturing of cereals, such as wheat, rye, barley and the like, as grain, or of cereal products such as flour, bran or offals, is specially advantageous, and the method and apparatus according to the main patent or as hereinbefore described afford effective means for the preparation of chlorine dioxide for this and other purposes. Chlorine dioxide possesses the property, in common with nitrogen trichloride and chlorine, of not only bleaching flour, but also of maturing it and improving its baking quality. This is a valuable property of these gases, but inasmuch as the relative degrees of bleaching and improving effected by a certain quantity of such a gas are unalterable, no variation in the ratio or relation between bleaching and improvement is possible. Thus, for example, if a sack, that is to say, 280 lbs., of a certain grade of flour is treated with, for example, two grams of chlorine dioxide or about six grams of nitrogen trichloride it is bleached and improved in baking quality to a certain degree and is suitable for many purposes, but if the flour is required to be still whiter, the increased quantity of gas necessary to secure this result effects over much maturing and may in many cases depreciate the baking quality. There is, therefore, a limit to the extent to which the bleaching can be carried with a gas which has the dual effect of bleaching and maturing or improving. This difficulty can only be overcome by the use of an additional bleaching agent used independently, such as benzoyl peroxide or oxides of nitrogen which are known to bleach effectively without exercising any sensible effect on baking quality. To utilize such agents involves either the troublesome addition of a powder whose effect is not apparent for some time, when it may be too late to effect regulation, or the use of the costly equipment necessary for the preparation of nitrogen oxides either electrically or chemically. Thus, in the use of the electric arc for producing oxides of nitrogen, little control of the actual quantity of oxides of nitrogen applied to the flour can be secured. The control is indefinite because the quantity of oxides of nitrogen produced depends not only on the amperage applied to the arc, but also upon the conditions of operation of the arc. Further, in a process of catalytic oxidation for the production of oxides of nitrogen the efficiency of the process depends upon the continued efficiency of the catalyst. The process of the present invention has the advantage that the production of oxides of nitrogen is fully under control and also the concentration of oxides of nitrogen produced is much greater than is usual, and a single apparatus of small size has the capacity of a number of apparatus of the known types of larger size.

The preparation of nitrogen oxide according to the present invention requires only a simple addition to the apparatus for the preparation of chlorine dioxide whereby the waste liquor therefrom is utilized to secure oxides of nitrogen in suitable form which will effect bleaching and thus provide cheaply and readily with one apparatus the means to vary the extent to which a flour is bleached or improved. The liquor leaving the chlorine dioxide apparatus is essentially acid in character and contains hydrochloric and/or sulphuric acids in excess and in addition sodium chloride and/or sulphate. The addition of a solution of sodium nitrite to this liquor causes the immediate evolution of oxides of nitrogen, and if the waste liquor, which is already metered, is allowed to mix with a metered stream of sodium nitrite solution and the mixture is caused to flow down a small tower suitably packed, the gases are easily removed with a stream of air or inert gas in which they may be carried and used to effect the desired bleaching. As the acid liquor is already a waste product the only cost involved is that of an addition of sulphuric acid, where this acid is used, and the sodium nitrite which is inexpensive and the only additions to the existing apparatus are, for example, a small storage tank for the sodium nitrite solution, a second liquid flow regulator and the small reaction tower suitably connected to the waste discharge outlet of the chlorine dioxide apparatus, the necessary additional air being supplied by the existing source, or, if desired, by a separate or additional supply.

The acid mixture used in the chlorine dioxide apparatus, where hydrochloric acid is present, is advantageously increased in sulphuric acid content so as to approximate to 50% strong hydrochloric acid and 50% of 70% sulphuric acid, whereby the chlorine dioxide production is not impaired and the waste liquor is more acid and reactive with the sodium nitrite. The stronger acid liquor is probably cheaper than the mixture containing less sulphuric acid in use for the production of chlorine dioxide and the production of waste liquor that is more strongly acid is in no way at the expense of the efficiency of the chlorine dioxide apparatus.

The stream of air containing nitrogen oxides is advantageously carried independently to the flour streams. As the sodium nitrite solution reacts with the acid liquor in excess it is only necessary to vary the flow of nitrite solution and the production of oxides of nitrogen is not affected by variations in the flow of waste liquid within very wide limits.

The invention is illustrated by the accompanying diagrammatic drawing, by way of example. The drawing represents apparatus for preparing chlorine dioxide and nitrogen oxides, for a purpose such as that of treating flour.

The chlorine dioxide generator comprises a shallow tray 1 having a slightly coned or concave surface 2 upon which is formed a spiral course for the reagents by the spirally arranged rib 3. The tray is closed by a domed cover 4 having a lateral inlet fitting 5 for the reagents and a central outlet fitting 6 for the discharge of the gaseous products of the reaction.

At the centre of the tray 1 there is mounted an upstanding pipe 7 which extends into the outlet fitting 6 and serves a purpose hereinafter described. Beneath the tray and co-axial therewith there is provided the packed tower or scrubber 8 into which the waste liquor from the tray passes by way of the perforations 9 in the pipe 7. The tower 8 is made in two parts and the lower part 10 is provided at the bottom with a central outlet 11 for the waste acidic liquor, which outlet is closed by a ball or float valve 12. The part 10 also carries a grid 13 for the support of the packing 14 of stoneware rings or balls or other like material. The upper part of the tower 8 is surrounded by an annular heating jacket 15 for the tray 1 having a tight joint with the tower formed by the gland ring 16 and provided with a thermostatically controlled heating element or heating device 17.

The outlet 11 of the tower 8 is connected to a U-shaped tubular fitting 18 in which the liquor discharged from the outlet 11 may accumulate to form a liquid seal and also to provide a head of the liquor to effect the supply of the liquor to a nitrogen oxide generator 19. In the particular apparatus illustrated in the drawing the generator 19 is in the form of a packed tower generally similar to the tower 8. The upper part of the tower is provided with a lateral inlet fitting 20 in which is mounted an axially disposed nozzle fitting 21, the outlet orifice of which is centrally disposed in the tower. An inlet fitting 22 for nitrite solution is axially disposed at the top of the tower while at the lower end of the upper part of the tower there is provided a grid 23 for the support of the filling 24 of stoneware rings or balls or the like. At the lower end of the lower part 25 there is provided a central outlet 26 for the waste liquors, the outlet being closed by the ball or float valve 27.

Three storage tanks 28, 29 and 30 are provided respectively for a solution containing sodium chlorate and sodium chloride, 70% sulphuric acid, and a solution of sodium nitrite containing, for example, 33%. Each tank is closed and is provided with an air pipe 31 for the admission of air under pressure above the liquid which is thus forced from the tank through a dip-pipe 32. The dip-pipes of the tanks 28 and 29 are respectively connected with the inlets of two flow regulators 33 and 34, the outlets of which serve to deliver sodium chlorate-sodium chloride solution and sulphuric acid respectively to the branches 35, 36 of a reagent supply conduit 37 that is connected to the inlet fitting 5 of the chlorine dioxide generator. Similarly the dip-pipe 32 of the tank 30 is connected to the inlet of a flow regulator 38, the outlet of which is directly connected to the inlet fitting 22 of the generator tower 19. The flow regulators may be of any suitable form but are advantageously of the kind described in the specification of Patent No. 2,316,848.

A power driven blower 39 is conveniently provided to deliver air under a constant pressure determined by a spring-loaded valve 40 to an air supply conduit 41 whence air under pressure is supplied to an air distributor 42 fitted with a non-return valve 43. A controlled outlet 44 of the air distributor supplies air to the air-pipes 31 of the three storage tanks 28, 29 and 30, the respective connecting conduits being preferably under individual control by valves 45, 46 and 47. The controlled outlets 48, 49 of the air distributor supply air respectively to the tower 8 at the inlet 50 and the tower 19 at the inlet 51. The controlled outlet 52 of the air distributor supplies air to the inlet passage 53 of the flow regulators 33, 34 and thence by way of the outlets of the flow regulators to the branches 35 and 36 of the supply conduit 37.

A conduit 54 connected to the outlet of the casing of the valve 40 leads through a non-return valve 55 to a conduit 56 connected in turn to a T fitting 57 mounted on the outlet fitting 6 of the cover 4 of the chlorine dioxide generator and serving to permit the passage of the gases and vapours from the generator to the discharge conduit 58.

The tower 19 is provided with a lateral outlet 59 for the gases and vapours which are discharged into the conduit 60.

Where the gases are required to be distributed in a number of directions, as in the case, for example, of the treatment of flour or the like, the conduits 58 and 60 may discharge respectively into manifolds 61, 62 whence the gases are passed to the several streams of flour or the like through corresponding regulating distributors 63, 64, one of which is illustrated in each case.

Water vapour present in the gases may be removed by passing the gases through condensers positioned between the fitting 57 or the outlet 59 and the manifolds 61, 62.

In the operation of the apparatus the air under pressure, delivered by the air blower 39 by way of the air distributor 42 to the storage tanks 28, 29 and 30, serves to cause the discharge of the respective reagents by way of the dip-pipes 32 to the respective flow regulators 33, 34 and 38 where the amounts of the supplies are carefully controlled. Thus the flow regulators 34 and 33 are set to transmit approximately half a volume of sulphuric acid to each volume of the solution of sodium chlorate-sodium chloride which pass by way of the branch conduits 36 and 35 to the conduit 37 where they are mixed before discharge into the outer convolution of the spiral course formed by the ribs 3 on the surface 2 of the tray. In view of the extended path which the reagents are thus caused to follow during the reaction there is no possibility of the admixture of quantities of the reagents in respect of which the reaction has reached different stages of development. Further, the passage of air under pressure through the flow regulators and the conduits 35, 36 and 37 into the reaction chamber creates a current of air by which the gases as they are evolved are carried away through the outlet 6 out of contact with the reagents. The possibility of undesirable side reactions is thus avoided and the production of chlorine dioxide proceeds with a maximum or high yield, chlorine dioxide and chlorine being produced substantially in the proportion of two volumes of chlorine dioxide to one of chlorine. The gases are further diluted with air from the conduit 54 as they pass through the fitting 57 to the conduit 58. The almost exhausted liquor arriving near the middle of the tray 1 passes through the holes 9 in the pipe 7 into the tower or scrubber 8 where the upwardly directed current of air from the inlet 50 removes substantially all remaining gas and carries it into the pipe 7. The gases are thus further cooled and diluted and leave the conduit 58 in a stabilised condition.

The waste liquor drains past the valve 12 through the outlet 11 into the fitting 18, which is open to the atmosphere by way of the passage 65. The liquor, which contains sodium sulphate, excess of sulphuric acid and traces of gases may receive an additional supply of sulphuric acid advantageously from the flow regulator 34. It accumulates in the fitting 18 until the head is sufficient to cause a feed of the liquor through the nozzle fitting 21 to be established. The liquor is thus brought into intimate admixture with the sodium nitrite solution delivered by the flow regulator 38 through the inlet 22 and flowing through the filling 24. The nitric oxide produced passes away with the air supplied at the inlet 51 and flowing upwardly through the tower, to leave by way of the conduit 60. The spent liquors, which accumulate at the bottom of the tower 19, are diluted with water which is admitted by way of the inlet 66 and leave by way of the outlet 26.

The apparatus for the preparation of chlorine dioxide as hereinbefore described and illustrated in the accompanying drawing may be used apart from the apparatus for the production of nitrogen oxide.

I claim:

1. Apparatus for the preparation of chlorine dioxide by contact of a solution of a chlorate with an acid reactant, comprising a reactor surface disposed substantially horizontally and having spaced elevations thereon defining an extended course for the flow of a liquid, a spacious enclosure for the said surface, the said enclosure having an inlet opening for the admission of liquid reactants and an inert gas and an outlet opening for the discharge of gaseous reaction products arising from the reaction mixture upon the reactor surface, regulable feed devices for supplying liquid reactants in admixture by way of the inlet opening to one end of the said course and an outlet at the discharge end of the extended course to discharge the waste liquid reactants from the surface.

2. Apparatus for the preparation of chlorine dioxide by contact of a solution of a chlorate with an acid reactant, comprising a reactor surface disposed substantially horizontally and having alternate high and low elevations, the high elevations defining an extended course for the flow of a liquid over the low elevations between them, an enclosure for the surface having an inlet opening for the admission of liquid reactants and an inert gas and an outlet opening for the discharge of the gaseous reaction products arising from the reaction mixture upon the reactor surface, regulable feed devices supplying liquid reactants in admixture by way of the inlet opening to one end of the said course and an outlet for the discharge of waste liquid reactants from the surface at the discharge end of the extended course.

3. Apparatus for the preparation of chlorine dioxide according to claim 1, comprising a tower located beneath the surface having an inlet to the said tower connected to the outlet at the discharge end of the extended course and receiving the waste liquid reactants by gravity from the surface, and having at the lower part an outlet for the waste liquid reactants and an inlet for the inert gas, an inert packing within the tower and an outlet conduit for gas and vapour extending from the inlet for the waste liquid reactants to the outlet for gaseous products of the enclosure for the surface.

4. Apparatus for the preparation of chlorine dioxide by contact of a solution of a chlorate with an acid reactant, comprising a shallow tray having thereon a spiral rib forming a spiral channel and a central outlet opening, a domed cover for the said tray having near the periphery an inlet opening for liquid reactants and for an inert gas and at a central position an outlet for the gaseous products of the reaction and the inert gas, feed devices for supplying liquid reactants in admixture to the inlet opening of the domed cover and a source of supply of the inert gas under pressure connected for feeding the inert gas to the inlet opening of the domed cover.

5. Apparatus for the preparation of chlorine dioxide according to claim 4, comprising also a scrubber tower disposed below the shallow tray and provided with a central opening at the upper end for receiving waste liquid reactants by gravity from the central outlet opening of the shallow tray, the said tower having at the lower part an inlet opening for the admission of inert gas and an outlet opening for the waste liquid reactants, an inert packing within the tower to ensure intimate contact of the gas and the liquid reactants and a gas discharge conduit extending from the central outlet opening of the tray into the outlet for gaseous products of the reaction in the domed cover.

6. Apparatus for the preparation of chlorine dioxide according to claim 4, having a heating chamber disposed below the shallow tray and a heating device within the said chamber.

7. Apparatus for the preparation of chlorine dioxide according to claim 4, having a discharge conduit connected to the outlet opening of the domed cover and a conduit from the source of supply of the inert gas connected to and discharging into the discharge conduit for effecting dilution of the gaseous products of the reaction.

8. Apparatus for the preparation of chlorine dioxide according to claim 1, having a discharge conduit connected to the outlet for the gaseous products of reaction and a source of supply of an inert gas under pressure and conduits extending from the said source to the feed devices and to the discharge conduit.

CYRIL HARRY EVANS.